United States Patent [19]
Felder et al.

[11] 3,718,056
[45] Feb. 27, 1973

[54] GEAR SHIFT CONTROL FOR AUTOMOTIVE TRANSMISSIONS AND THE LIKE

[75] Inventors: Winfried Felder, Aulendorf; Walter Kuhn, Friedrichshafen, both of Germany

[73] Assignee: Zahnradfabrik Friedrichshafen Aktiengesellschaft, Friedrichshafen, Germany

[22] Filed: Aug. 30, 1971

[21] Appl. No.: 176,180

[30] Foreign Application Priority Data

Sept. 1, 1970 Germany................P 20 43 196.3

[52] U.S. Cl.................74/865, 74/731, 74/752 A, 74/863, 192/109 F
[51] Int. Cl......B60k 21/02, B60k 29/00, B60k 33/00
[58] Field of Search........74/863, 864, 865, 866, 867, 74/868, 869, 752 A, 731; 192/109 F

[56] References Cited

UNITED STATES PATENTS

| | | | |
|---|---|---|---|
| 2,282,949 | 5/1942 | Dolza | 74/865 |
| 2,711,656 | 6/1955 | Smirl | 74/864 |
| 3,310,991 | 3/1967 | Leonard | 74/864 |
| 3,416,393 | 12/1968 | Hattori | 74/731 |

*Primary Examiner*—Milton Kaufman
*Assistant Examiner*—Thomas C. Perry
*Attorney*—Karl F. Ross

[57] ABSTRACT

A drive-establishing clutch or brake of an automotive power train, actuated hydraulically upon a shifting into gear, is connected through an individual control valve to a high-pressure duct communicating alternately with a source of constant hydraulic pressure and a source of variable hydraulic pressure dependent on such operating parameters as load and engine speed. As the gear-shift lever ist moved out of central position, a switch is closed to measure a short time interval after which the system switches from variable to constant supply pressure.

6 Claims, 1 Drawing Figure

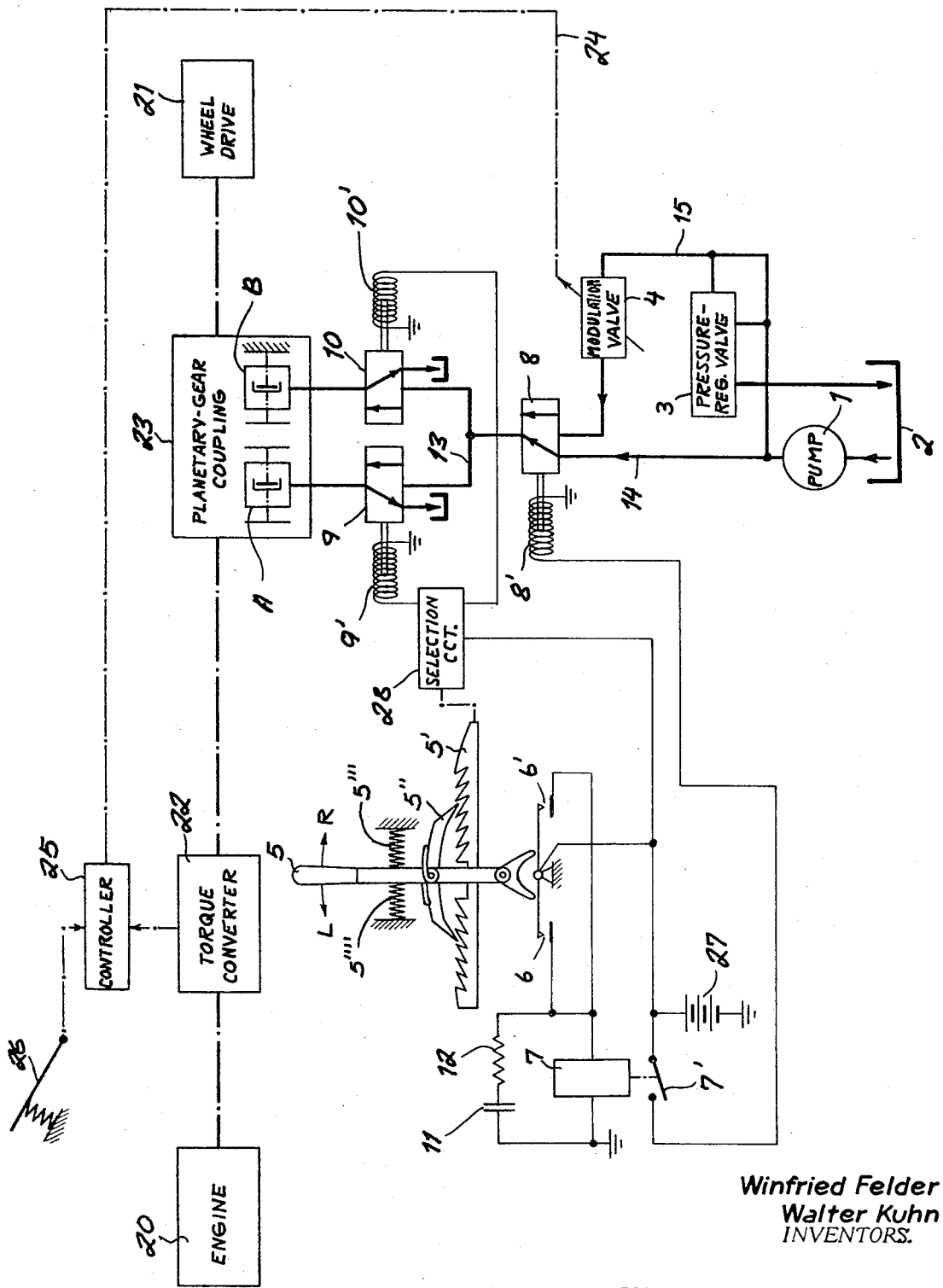

1

GEAR SHIFT CONTROL FOR AUTOMOTIVE TRANSMISSIONS AND THE LIKE

Our present invention relates to a system for controlling the gear shift in automotive and other transmissions wherein an engine drives a load through a power train including means, such as a planetary-gear coupling, for establishing different speed ratios by the actuation of one or more hydraulic brakes and/or clutches.

Such hydraulically operated clutches or brakes, which in this context have come to be referred to in the art as drive-establishing means, are advantageously actuated under a fluid pressure whose magnitude varies with different operating conditions, in response to such external parameters as engine speed and load, to afford a smooth transition. Once the clutch or brake laminae begin to engage, however, the variability of this fluid pressure is no longer required and may in fact be disadvantageous by unduly prolonging the period of slippage with generation of excessive frictional heat. Also, maintenance of a firm engagement is not assured if the hydraulic pressure is subject to substantial fluctuations.

It is, therefore, the object of our invention to provide an improved control system which avoids the aforestated drawbacks without sacrificing the adaptability of the gear-shift mechanism to different conditions of use.

This object is realized, pursuant to the present invention, by the provision of two separate sources of hydraulic fluid for the drive-establishing means (clutches and/or brakes) to be controlled, one of these sources having a conduit carrying the fluid at a stabilized supply pressure whereas the other source is a conduit in which the pressure varies in response to one or more of the aforementioned external parameters. The two conduits are alternately connectable to a control valve associated with the clutch or brake to be operated in accordance with the setting of the usual shift lever or equivalent speed-ratio selector. A timing circuit, which may be triggered by the displacement of that selector into one of its several gear-shift positions, connects that control valve initially to the variable-pressure source and, at the end of a predetermined period, switches it to the constant-pressure fluid supply. The duration of that period is determined by the time constant of the timing circuit, advantageously an R/C network, and is independent of the pressure-modifying parameters and of the speed with which the selector is operated.

The invention will now be described in detail with reference to the accompanying drawing the sole FIGURE of which diagrammatically illustrates a representative embodiment.

In the drawing we have illustrated an internal-combustion engine 20 driving a load 21, here the traction wheels of an automotive vehicle, through a conventional power train including a hydraulic torque converter 22 and a planetary-gear coupling 23. Different speed ratios can be established, as is well known per se, by the selective actuation of several drive-establishing means in gearing 23, such as a clutch A and a hydraulic brake B.

A pump 1 continuously delivers oil from a sump 2 to a pair of conduits 14, 15 which are connected to its high-pressure port by way of a pressure-regulating valve 3 provided with a calibrating spring and a return line. Conduit 15 contains a modulation valve 4 whose effective cross-section is variable through a mechanical or electrical connection 24 from a controller 25 which responds to several operating parameters as, for example, to the position of accelerator pedal 26, to the speed of the turbine wheel of torque converter 22 and/or to the engine 20 operating in traction or as a brake.

The two conduits 14, 15 are alternately connectable to a common duct 13 by means of a valve 8, of the type sometimes referred to as a 3/2-way valve, electromagnetically controlled by a solenoid 8' whose energizing circuit includes a battery 27 (such as the usual vehicular battery) in series with an armature 7' of an electromagnetic relay 7. The winding of that relay is shunted by a reactive loop including a condenser 11 in series with a resistor 12; this winding is energizable from battery 27 by way of contacts 6 and 6' which are controlled by a shift lever 5. One of the contacts is closed when that lever is displaced from its central position to change the speed ratio.

Lever 5 is retained by springs 5''' and 5'''' in its central position. For changing to higher gear of planetary transmission 23 the lever 5 is to move in the direction of arrow R; for changing to lower or reverse gear the lever 5 is to move in the direction of arrow L. By moving the lever 5 out of its central position, a gear-shift rod 5' is displaced one tooth by a pawl 5''. Such movement of the gear-shift rod 5' establishes a speed ratio in a selection circuit 28 which connects the battery 27 to energize solenoid 9' and/or 10'. Whereupon the valve 9 and/or 10 controls the admission of high-pressure oil from duct 13 to clutch A and/or brake B.

Whenever lever 5 is moved out of its central position, one of the contacts 6, 6' is closed; relay 7 is then energized by the battery 27 and the contact 7' is closed. Thereby the solenoid 8' is energized and the valve 8 connects duct 13 with duct 15 by way of modulation valve 4. Now, clutch A and/or brake B are engaged by a fluid pressure which is modulated by controller 25 and modulation valve 4.

When gear shifting is finished, lever 5 returns to its central position, contact 6 or 6' opens and battery 27 is cut off from relay 7 whose winding, however, remains briefly energized by the charge stored in capacitor 11 which now discharges through resistor 12.

It will be apparent that impedances 11 and 12 could be omitted if relay 7 were of the slow-releasing type and that other changes may be made in the electrical and hydraulic circuits without departing from the spirit and scope of our invention as defined in the appended claims.

We claim:

1. In a transmission system including a power train with hydraulically actuatable drive-establishing means for changing the speed ratio between a prime mover and a load interconnected by said power train, selector means for such speed ratio, and valve means controlled by said selector means for admitting hydraulic fluid to said drive-establishing means, the combination therewith of:
   a supply of hydraulic fluid under substantially constant pressure;
   a source of hydraulic fluid under a hydraulic pressure varying in response to an external parameter;
   switchover means for alternately connecting said valve means to said supply and said source; and control means responsive to said selector means for operating said switchover means to connect said valve means initially to said source upon establishment of a new speed ratio and to switch to said supply at the end of a predetermined period.

2. The combination defined in claim 1 wherein said control means includes a timing circuit and relay means in said circuit.

3. The combination defined in claim 2 wherein said selector means comprises a manually operable shift lever with a central position and gear-shift positions, said control means further including switch means in said circuit positioned for operation by said lever upon displacement thereof into any gear-shift position.

4. The combination defined in claim 2 wherein said timing circuit comprises an R/C network.

5. The combination defined in claim 1 wherein said supply comprises a hydraulic pump with a high-pressure port, pressure-regulating means at said port and a first conduit branching off said port downstream of said pressure-regulating means, said source including a second conduit branching off said port and an adjustable throttle valve in said second conduit responsive to said external parameter.

6. The combination defined in claim 5 wherein said switchover means comprises a 3/2-way valve with inlet ports connected to said conduits and an outlet port connected to said drive-establishing means.

* * * * *